United States Patent [19]

Wodenka

[11] 3,836,729

[45] Sept. 17, 1974

[54] AUTOMATIC TELEPHONE SIGNALLING APPARATUS

[76] Inventor: Anthony J. Wodenka, c/o Mr. Harry G. Kososki, 5840 E. Lafayette Blvd., Phoenix, Ariz. 85018

[22] Filed: July 3, 1972

[21] Appl. No.: 268,527

[52] U.S. Cl. .............................................. 179/90 B
[51] Int. Cl. .......................................... H04m 1/45
[58] Field of Search .......... 179/90 B, 90 K, 90 R, 5, 179/90 AD, 81 R, 2 A

[56] References Cited

UNITED STATES PATENTS

| | | | |
|---|---|---|---|
| 1,972,289 | 5/1929 | Chauveau | 179/90 B |
| 2,799,729 | 7/1957 | Lovell | 179/90 B |
| 3,078,349 | 2/1963 | Sasaki | 179/90 B |
| 3,305,644 | 2/1967 | Watanabe | 179/90 B |
| 3,366,747 | 1/1968 | Holzer | 179/90 B |
| 3,418,431 | 12/1968 | Hershey | 179/90 B |
| 3,509,286 | 4/1970 | Driscoll | 179/90 B |
| 3,549,810 | 12/1970 | Driscoll | 179/90 B |
| 3,665,113 | 5/1972 | Blake | 179/90 B |
| 3,681,535 | 8/1972 | De Meulenaepe | 179/90 B |

*Primary Examiner*—Kathleen H. Claffy
*Assistant Examiner*—Thomas D'Amico
*Attorney, Agent, or Firm*—Andrus, Sceales, Starke & Sawall

[57] ABSTRACT

An electromechanical telephone dialer for connection to a conventional telephone system including a dial switchboard matrix having a plurality of columns each with 10 openings, one each of the telephone number digits. A contact strip is secured adjacent each column. An input board has a contact button for each opening, with depressions extending the contact button passed the associated strip. A carriage moves a leaf spring contact over each column to complete the circuit from the depressed button to the strip. A similar interlock board is mounted in stacked relation and has a common switch for each column actuated by the aligned buttons. The circuit boards and a stripping switch are interconnected to sequentially scan each of the columns, with the first column scanned until the appropriate character related contact means is engaged. The carriage is spring reset and coupled to actuate the dialing means. The cycle continues until the last number in the final column is transmitted. A drum timer is connected to initiate a code transmitting cycle, transmit a message, if desired, over the telephone lines and then reset the apparatus.

8 Claims, 8 Drawing Figures

AUTOMATIC TELEPHONE SIGNALLING APPARATUS

BACKGROUND OF THE INVENTION

This invention relates to an automatic telephone transmitting system for data transmission from a remote reporting station to one or more receiving stations through the conventional public switched telephone system.

Various automatic systems have been suggested for detecting an undesirable or dangerous condition and then automatically sending an alarm or warning to a remote station over the conventional telephone lines. Many systems employ means for actuating of the conventional telephone dial while other systems employ electronic controls or the like to simulate the actuation of the conventional telephone dialing apparatus to provide a corresponding transmission over the telephone lines.

SUMMARY OF THE PRESENT INVENTION

The present invention is particularly directed to an electromechanical automatic dialing and signalling apparatus for connection to a conventional telephone system which permits convenient selection of any one of a plurality of remote stations. An automatic start means may be provided for responding to a sensed condition and the apparatus may also transmit a coded signal to the remote station in response to such sensed condition. In particular, in accordance with the present invention, the transmitting apparatus includes a switching matrix having a plurality of individual grouped switching elements or means for each of the possible character positions or elements in a multiple element telephone call code in combination with a scanning means to successively scan the switching matrix and thereby provide automatic dialing of a dial type telephone system. The conventional telephone dialing system, for example, employs an 11 digit telephone number including a first element or position for a long distance call, a subsequent three elements relating to an area and seven elements establishing a particular station or telephone within a given area. In accordance with a particularly novel aspect of the present invention, a switching network includes a switching matrix with a separate switch column includes a circuit altering means, such as a switch means for each of the possible identifying characters or digits. A sequence circuit includes a scanning means to sequentially scan each of the columns to locate an actuated or set means. The scanning means scans the several columns, with the first column scanned until the appropriate character related switch means is actuated. This automatically terminates the scanning and resets the scanning means for subsequent scanning of the next column. During the resetting, a dialing means dials the corresponding digit or character of the telephone number, or with the more recent dialing system, an appropriate frequency signal is established. The cycle will continue until the last number or character in the final column has been transmitted, at which time the scanning system returns to the standby position. A timing apparatus completes a code transmitting circuit to transmit the desired information over the telephone lines to the receiving station. The timer will automatically reset the apparatus for a subsequent response.

In a preferred construction of the present invention the apparatus includes an enclosure for housing within which the switching and dialing apparatus is housed. An input matrix of push-button units is provided with columns related to the several elements of a telephone number and rows extending downwardly along the front of the housing in accordance with the ten permissible digits employed in the convention telephone system. The desired receiving station is selected by the user by punching out the telephone number on the push-button units beginning on the left column and proceeding to the right. Eleven columns permits direct calling of essentially any telephone number in the United States. The front of the apparatus may also include a main on-off switch and an indicating light. In addition, a cancel button is provided to remove an inserted telephone number to permit direct insertion of a new number.

Each of the push-button units has an associated contact control pin which projects downwardly through a pair of contact control boards, the first of which is a dialing control board and the second of which is an interlock control board for controlling sequencing of the dialing and terminating the dialing after transmission of the character of the last position or element in the called number. The dialing board is constructed with openings, one for each of the push-button pins and with contact strips for the several columns. The ends of the pin includes a metallic contact which, when depressed, is located in the path of a scan contact to complete a stop circuit. A scanning carriage carries the scan contacts over contact strips and openings to engage a depressed pin. A switch is provided to sequentially connect the columns to the drive circuit and terminates the drive of the scanning system when the last column has been scanned.

The initial energization of the driving circuit is interconnected through the second or interlock board. This board is similarly formed as an apertured member with corresponding contact strips one for each of the columns. The depression of any button in any column provides a circuit connection which is connected in the initiating and drive for operation of the stepping switch unit. Thus, the stepping switch and mechanism will be actuated only until the unit steps to a column in which a push-button unit has not been depressed. When that column is reached the circuit is opened at the second dial board.

The timer then functions to couple the code signalling device to the coupling transformer of the telephone and in particular provides for the transmission of a coded signal over the telephone lines. Thus, a very simple and reliable system employs a microphone such as a carbon unit generally employed in modern telephone devices. A cam unit driven from the dialing motor strikes the microphone and taps out a coded signal.

The timer resets the apparatus to its initial starting or rest position and may be constructed to provide a continuous recycling for any given period of time.

The present invention thus provides a simple, reliable and relatively inexpensive electromechanical system for automatically transmitting warning signals from a given location to a remote control or receiving station.

BRIEF DESCRIPTION OF DRAWINGS

The drawings furnished herewith illustrate any preferred construction of the present invention in which the above advantages and features are clearly disclosed as well as others which will be readily understood from the following description.

In the drawings.

DESCRIPTION OF THE ILLUSTRATED EMBODIMENTS

Figure 1:
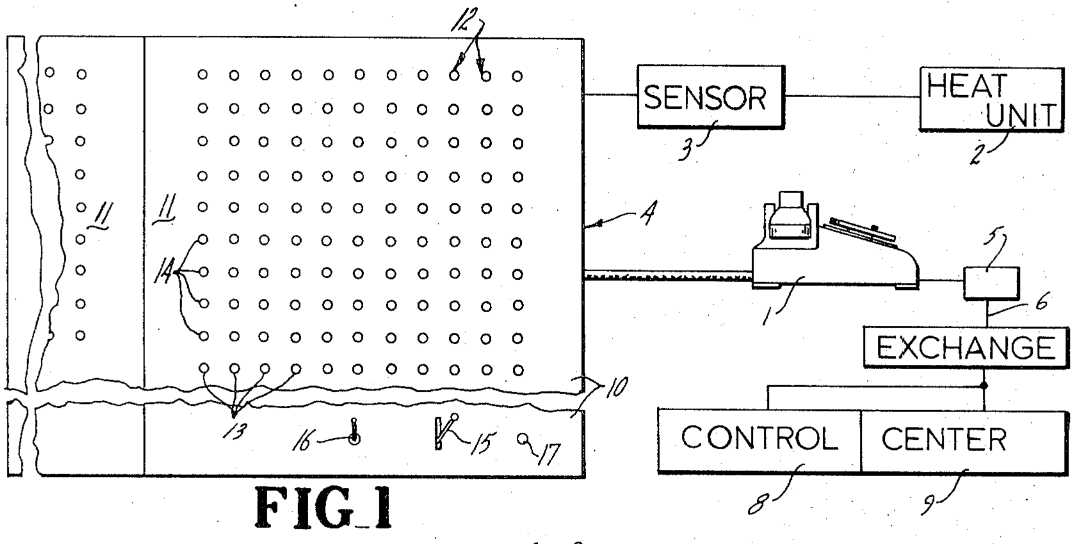
FIG. 1 is a diagrammatic view of an automatic alarm system employing an electromechanical dialing apparatus constructed in accordance with the present invention.
Figure 8:
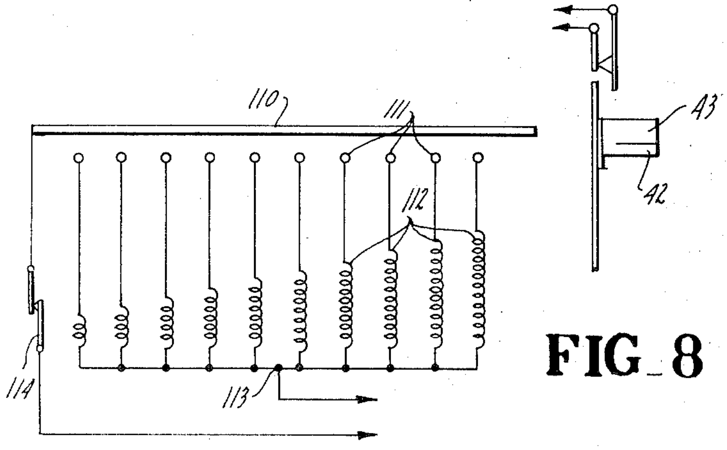
FIG. 8 is a diagrammatic view of a frequency coded dialing system.

Referring to the drawings and particularly to FIG. 1 a conventional telephone 1 is shown located within an area including a heat source such as a conventional heating unit 2. A heat sensor 3 such as a bimetal unit is provided to respond to any abnormal heat conditions for actuating an automatic telephone signalling transmitter 4 in response to abnormal heat conditions. The transmitter 4 is connected directly to the conventional telephone transformer and connecting network 5 and thus to the telephone lines 6 which are, of course, connected to the central telephone office or offices 7. The telephone center connects the lines into the general telephone system and for purposes of explanation is shown connected to a pair of monitoring or control stations 8 and 9. Thus, if the automatic transmitter 4 is operative, it will respond to abnormal temperature conditions as detected by the sensor 3 to establish a cycle of operation.

The automatic transmitter 4 is operative in sequential fashion to establish an operative off-hook condition on the line 6 via the network 5, to then establish an out pulse condition in which the dial digits of the telephone number for the control centers 8 or 9, or both in sequence, are transmitted and after the transmission of such dial digits, to transmit an alarm signal. As more fully developed hereinafter the transmitter 4 will provide cyclical operation until such time as the abnormal condition has been removed either with self-correction or positive attention. The illustrated automatic transmitter 4 includes an outer housing or casing 10 within which the various operating electrical and mechanical elements are housed. The transmitters 4 includes one or more push-button selection sections 11 within each of which a plurality of individual push-button units 12 are mounted for manual positioning. Each section 11 provides for insertion of the telephone number of a remote or control station. In the illustrated system, a pair of input sections 11 are provided for stations 8 and 9, respectively. As they are correspondingly constructed only one section is shown and described in detail.

The push-button units 12 are arranged in a matric of eleven columns 13 and 10 rows 14. Each column thus includes 10 push-button units and each row includes eleven push-button units 12. Each column 13 is related to a character position in the conventional telephone number system employed in this country, which generally includes a one element long distance code, an area code of three elements and a particular telephone number of seven elements. Each element or position is identified by anyone of the conventional decimal digits 1 through 0 and each column is thus constructed with 10 push-button units 12, one of each of the 10 rows 14 and related to each of the corresponding digits one through zero.

Thus, the user can insert any desired telephone number into the transmitter beginning with the first element of the number by punching in the first or the leftmost column and then moving across until the final element has been inserted with an appropriate digit. In accordance with the illustrated embodiment of the invention the user begins in the left column regardless of the particular form of number being inserted. Thus, if the number is a local number in which only seven positions appear, those seven positions would be placed in the first seven columns beginning with the lefthand column.

Once the number is inserted, it can be removed for insertion of a new number through the operation of a cancel lever 15 which will release all of the push-button switch units 12 in that section. Further a main on-off switch 16 is provided for selectively connecting the transmitter 4 into the system. An on-light 17 may be employed to provide a visual indication when the automatic device is in operation.

Figure 2:
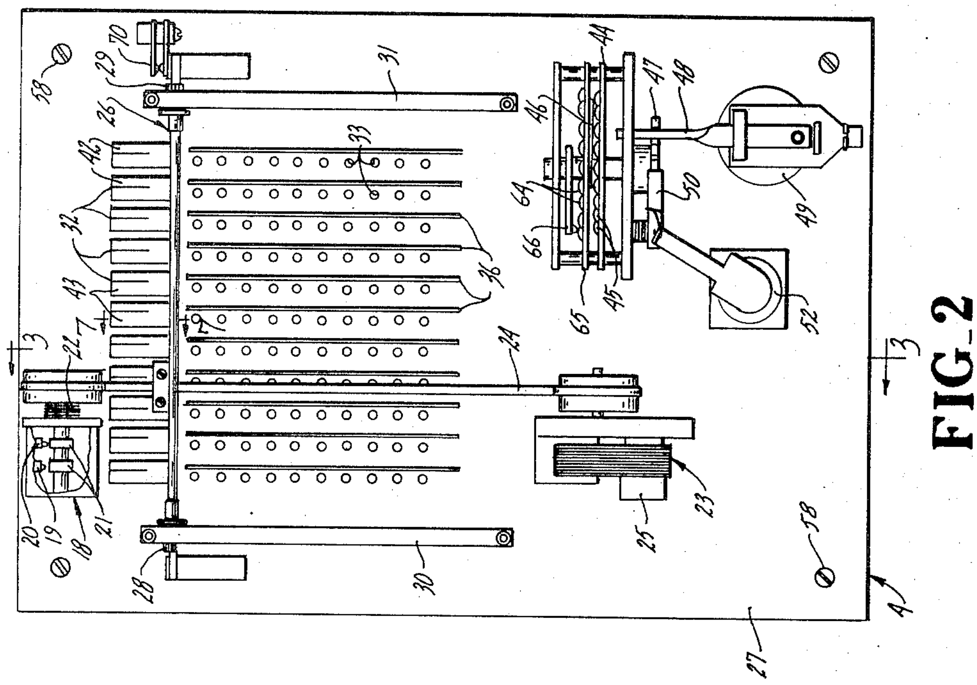
FIG. 2 is a bottom view of the mechanism shown in FIG. 1.
Figure 3:
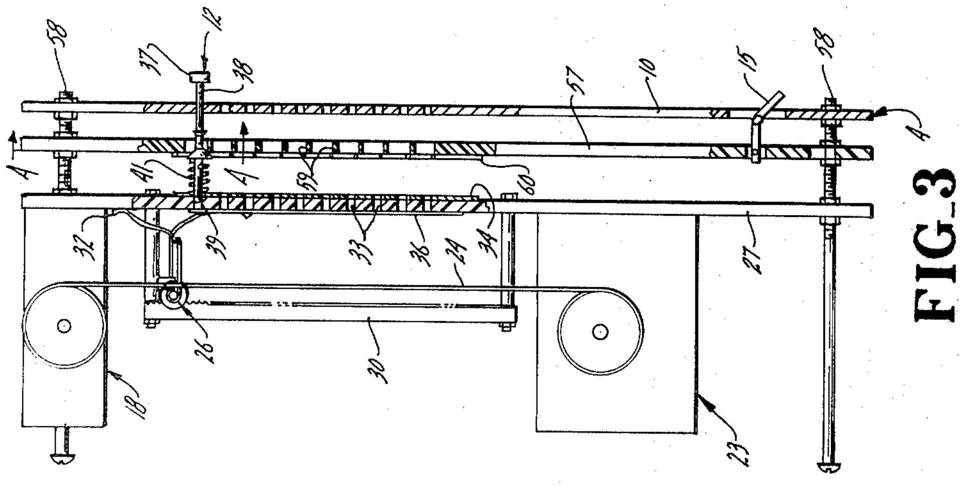
FIG. 3 is a vertical section through the apparatus as shown in FIG. 2 and taken generally on line 3—3 of FIG. 2.
Figure 6:
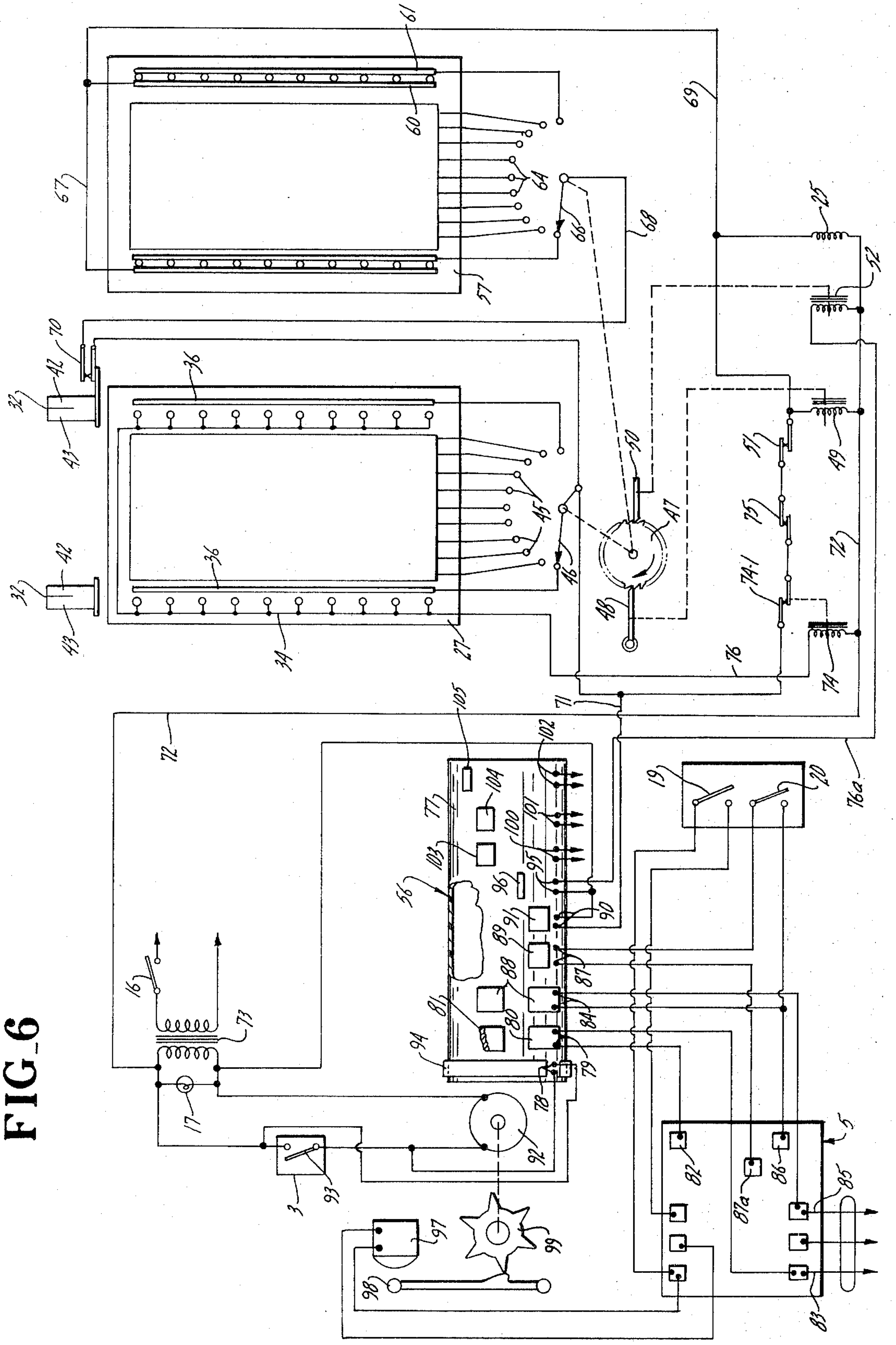
FIG. 6 is a schematic circuit of the system.

Referring particularly to FIGS. 2 and 3, the transmitting unit 4 is shown as an electromechanical device constructed in accordance with the present invention and in particular including a telephone dialing unit 18 which generally corresponds to the conventional telephone dialing unit which is manually actuated to dial a remote receiving station and which is similarly connected to the telephone lines via a conventional coupling transformer such as manufactured and sold by Western Electric and including a coupling network such as shown in "The Standard Handbook for Electrical Engineers" published by McGraw-Hill Publishing Co. Thus, the dialing unit 18 includes a normally open switch 19 which is actuated during dialing to cutoff the receiver circuit to the telephone line connection. A dialing switch 20 is connected to the telephone line coupling transformer network 5 in series with a timer actuated switching means, as shown in FIG. 6. A rotating cam 21 selectively closes switch 19 and sequentially opens and closes the dialing switch 20 in the same manner as that employed in the conventional rotating unit. The dialing unit 18 is rotated with a positive forward drive corresponding to the manual rotation, with a dial return spring 22 providing for a constant speed return thereby providing for the desired timed actuation of the dialing switch 20 for out-pulsing of a selected digit.

In accordance with the illustrated embodiment of the invention, the dial unit 18 is set through a motor driven assembly 23 including a pulley and coupling belt unit 24 interconnecting the dial unit 18 to a dial motor 25 of assembly 23. By establishing a timed energization of the dial motor 25, the dial unit 18 is rotated from its normal standby position in accordance with the conventional dialing of a rotary dial unit. The dial motor 25 is deenergized at an appropriate time in accordance with an actuated push-button unit 12 of the push-button matrix to release the dial unit 18 and allow it to rotate back to the zero position under the force of the dial return spring 22 thereby simulating the manual dialing of a telephone digit. By scanning the several code element positions in proper timed sequence, the remote telephone station number is dialed.

The switching control system includes, in the illustrated embodiment of the invention, a carriage 26 secured to and moved simultaneously with the pulley belt 24 to scan a switching matrix board 27. The carriage 26 is generally a bar-like member with rotating gears 28 and 29 secured to the opposite ends and rotatably supporting the opposite ends of the carriage 26 upon a pair of carriage racks 30 and 31. This provides for accurate synchronized movement of the carriage and belt pulley and the interconnected dialing unit 18.

A plurality of sensing or scanning contacts in the form of leaf springs 32 are secured to the carriage 26 and includes a separate sensing contact for each of the columns of the push-button matrix shown in FIG. 1. The switching matrix board 27 is formed of a suitable insulating material and provided with a plurality of matrix holes 33 arranged and aligned with the respective push-button units 12 shown in FIG. 1. The one side, shown as a side facing the push-button units in the illustrated embodiment of the invention, is provided with a continuous ground plate 34 which is affixed to the corresponding circuit of the board 27. This provides a common circuit connection means to a lead 35.

Eleven contact wires or strips 36 are secured to the opposite side of the insulating board, with each strip aligned with and located immediately adjacent a corresponding column of holes 33. Each strip 36 extends at least the complete length of the contact holes 33 for the corresponding column and is selectively connected to the common plate 34 by actuation or depression of one of the push-button units 12 and alignment of a scanning contact 32.

Figures 4, 5:
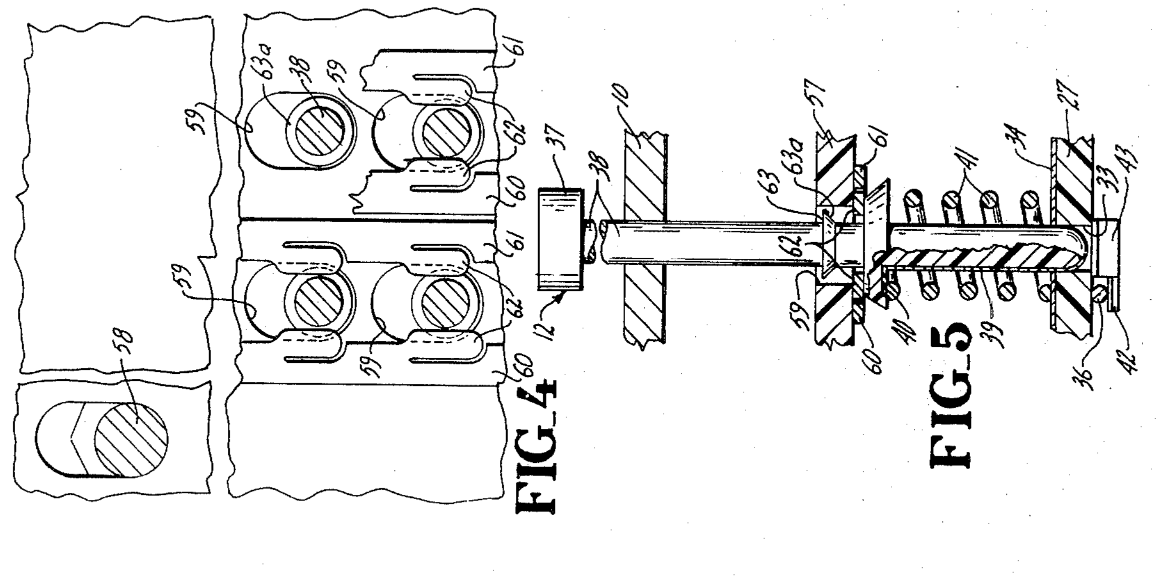
FIG. 4 is a fragmentary enlarged sectional view taken generally on line 4—4 of FIG. 3 and illustrating the construction of the dial interlock board.
FIG. 5 is an enlarged fragmentary view of the dialing and interlock board with a contact unit in the actuated position.

Referring particularly to FIGS. 3 and 5, each of the push-button units is shown including an outer plastic button head 37 exposed to the exterior side of the housing 10. A stem 38 of a suitable insulating material is secured to the button head and extends downwardly through the housing in alignment with the corresponding openings 33 in the dialing board 27. The lowermost end of the stem 38 is formed with a metal contact 39 which is aligned with and adapted to pass through the opening. The upper portion of the contacts 39 is formed with a flange 40 somewhat larger than the size of the opening. A coil spring 41 encircles the tip 39 between the flange 40 and the common circuit plate 34 on board 27. When the contact pin 38 is depressed the tip 39 projects through the opening 33 and outwardly into alignment with the appropriate sensing contact 32 for selective connection to the corresponding contact strip 36.

Each of the sensing contacts 32 is a plate-like spring member which is longitudinally split to define a pair of leaf-spring contacts including a bar or strip contact 42 aligned with the appropriate strip 36 and a pin contact 43 aligned with the corresponding column openings 33 in board 27 for the particular element. As the carriage 26 scans the openings, the contact 42 establishes continuous contact with the contact strip 36. Upon engagement of the contact 43 with the first push-button contact 39 which has been depressed, the circuit is completed.

Each of the contact strips 36 is connected via suitable contact leads **43*a* to the contacts of a stepping switch contact plate 44 of a stepping switch assembly 44*a* shown in FIG. 2 and connected as shown more fully in FIG. 6. In particular, the contact plate 44 is provided with individual contacts 45 one for each of the contact leads 43*a*. A rotating contact 46 sequentially and selectively engages each of the contacts 45** to provide sequential connection of the several strips into a dialing circuit as hereinafter described.

The stepping switch assembly can, of course, be constructed in accordance with any well-known device or construction. A suitable stepping switch unit, which is shown in FIGS. 2 – 6, includes a spring loaded ratchet wheel 47 which is coupled to and drives the rotating contact 46 across the contact plate 44. A spring loaded ratchet 48 is connected to the ratchet wheel 47 and coupled to a cocking coil 49. A latch dog 50 is pivotally mounted in engagement with the ratchet wheel 47 and holds it in the driven position. The energization of the coil 49 retracts the spring loaded ratchet element 48. Deenergization of the coil 49 causes the ratchet to move forwardly engaging the ratchet wheel 47 and driving it one step forward. In this manner the rotating contact 46 is rotated one step corresponding to the spacing of the contacts 45 on the fixed contact plate 44 thereby providing for the sequential interconnection of the rotating contact 46 to the fixed contacts by the energization and deenergization of the coil 49.

The coil 49 when energized to withdraw the ratchet 48 mechanically closes a set of latch contacts 51 to hold the coil energized and in the cocked position. Thus, the coil must be deenergized before it will actually move the rotating contact or ratchet wheel forward one step. A reset coil 52 is coupled to the dog 50 and is adapted to positively move the dog to the release position and allow the ratchet wheel 47 to move backwardly under its own spring bias to the standby or initial starting position. As such ratchet drive systems are well-known, no further description thereof is given.

The energization of the drive coil 49 and the dial motor 25 is energized initially through a master timer 56, shown in FIG. 6, which is actuated by the output of the condition sensing means and through an interlock circuit board 57 which is especially constructed to provide for the initial energization of the circuit board 27 and of the stepping switch coil 49 with the dial motor 25 and furthermore to terminate the out-pulsing when the last digit has been dialed.

The circuit board 57 is also formed of a suitable insulation material and mounted in stacked relation with the dial board through a suitable stacking and support element 58. The board 57 is provided with a plurality of holes 59 arranged in a matrix corresponding to push-button units and the dial board holes 33. The holes 59 are slightly larger than holes 33 and permit free passage of the spring retaining flange 40. A pair of contact strips 60 and 61 are secured to the underside of the board 57 with a separate pair of parallel strips provided for each of the columns. Each pair of contact strips extends along the opposite side of the corresponding column of holes and includes slots defining a leaf contact finger 62 overlying the adjacent edge of the adjacent holes 59.

The push-button unit 12 includes an annular contact 63 secured to the stem 38 in axially spaced relation to the contact tip 39. The underside of the contact 63 is cone-shaped as at 63*a* such that as stem 38 moves through the opening the cone-shaped portion of the contact deflects the contact fingers 62 and allows the contact to move past the fingers. When the unit 12 is released, contact 63 engages the contact fingers 62 to form a firm circuit connection between the common contact fingers.

The board 57 is mounted for sliding movement on the support 58 and in a plane normal to the stems 38. To reset the push-button units, the cancel lever 15 is pivoted and connected to slide the board to align the support shoulder 63 from the contacts 62 and with the enlarged opening 59 which allows the push-button units to move upwardly to normal standby position. As most clearly shown in FIG. 6, the one contact of each pair is respectively connected to the contacts 64 of a stepping switch plate 65 having a movable contact 66 ganged to and operated in synchronism with the first movable contact 46 of the stepping switch assembly. The other contact of each pair is connected in common to a lead 67.

A pair of leads 68 and 69 connect the movable contact 64 and the common contact lead 67 in series with a set of position control contacts 70 between the one side of the coil 49 of the stepping switch assembly and a board power line 71 which derives power through the timer 56. The opposite side of the coil 49 is connected directly to a second common power line 72 connected directly to the output side of a step-down transformer 73.

The contacts 70 are position control contacts which are coupled to be actuated by the dial carriage 26 to ensure that the system starts with the dial carriage in a zero or standby position.

Referring particularly to FIG. 6, the energization of the relay 49 results in the closing of the latching contacts or switch 51 which, in turn, provide a latch connection to the power line 71 in series with the normally open contacts 74-1 of a reset relay 74 and a safety switch 75.

The relay 74 has a coil with one side connected directly to the common power line 72 and the opposite side connected via a lead 76 to the common contact plate 34 of the dialing contact board 27. Thus, when the dialing contact board is set to complete the circuit from a contact pin 39 of push-button unit 12 the associated movable contact 46 of the stepping switch connects the relay coil 74 to power and the coil is energized to open the associated contact 74-1, thereby breaking the latch circuit for the coil 49 of the stepping switch. The stepping switch coil 49 is deenergized resulting in movement of the contact 46 to a next forward position, as previously noted. This simultaneously also breaks the circuit to the dialing motor 25 allowing the dial return spring 22 to function and rotate the dial unit 18 back towards the initial position with periodic operation of switch 20. This provides for the simulated dialing.

The dialing return also returns the dial carriage 26 to the initial position for closing the starting interlock contacts 70 and producing a power connection to coil 49 through contacts 70 and the interlock circuit board to again set the stepping switch for scanning of the next position or column. The scanning continues until the second board fails to have a contact closure in the column to be scanned. The apparatus is also controlled by the timer 56 to establish a period to scan all eleven columns and then to energize relay 52 via a reset power line 76*a* and establish a signal period.

The timer 56 may be any suitable timing mechanism adapted to control electrical circuits and is shown as a motor driven drum switch unit assembly including contact drum 77 adapted to selectively actuate a series of switches 78.

The several switches 78 are diagrammatically illustrated as pairs of adjacent leaf spring contacts located in axially spaced relation adjacent the periphery of the drum, which is provided with drum contacts adapted to selectively engage the leaf spring contacts in accordance with the rotational position of the drum and to thereby complete a circuit therethrough.

The several switches 78 include a first line coupling switch 79 with a pair of circumferentially spaced drum contacts 80 and 81 located to sequentially close the switch 79 during the dialing of the first and second numbers respectively. The switch 79 is connected to the coupling transformer network 5 and in particular connected the one terminal 82 to the telephone line 83 to simulate lifting of the handset and provide for transmission of the pulse signals. The second switch 84 is also connected to the one side of line 85 of the telephone lines 6 and to one of the transformer dial terminals 86 to correspondingly connect the second line to the dialing system. The dial terminal 86 is also connected to the one side of the dial switch 20 of the dialing unit 18. The second side or lead of dial switch 20 of unit 18 is connected in series with a third switch or set of normally open drum contacts 87 to a line dial terminal 87a of the coupling transformer network 5 and thus in series with the dial circuit of network 5. The second and third switches 84 and 87 are actuated by drum contacts 88 and 89 aligned with the coupling contacts.

The one power line 72 directly provides power from the step-down power transformer 73 to the dial boards. The opposite side of the transformer 73 is connected to the circuit boards and particularly to the start and latch relay line 71 via a fourth drum switch 90 which is closed by a fourth drum contact 91 generally aligned with the drum contacts 80 and 87, but having the leading edge circumferentially offset to form a delay means for actuation of the dialing means. The delay permits the completion of the telephone line circuit before formation of dialing pulses by the automatic dialing apparatus.

The timer 56 is driven by a motor 92 and rotates slowly to maintain the four switches 79, 84, 87 and 90 closed, during which period the dialing apparatus cycles through the several positions to automatically pulse the telephone number and ring the remote station 8. The motor 92 is energized by the sensor 3 which is shown as a bi-metal switch 93. The motor 92 also drives a cycle latch switch 94, shown as control band on drum 56, to complete one cycle.

At the end of the time period necessary to dial the eleven columns, a fifth drum switch 95 is actuated by a small drum contact 96 secured in circumferential spaced relation to the previously described drum contacts.

The fifth drum contacts 96 connect the tranformer line to the reset power line 76*a* of reset coil 52 to momentarily actuate the coil and reset stepping switch unit to the home position.

In accordance with the present invention a coded message is then transmitted over a microphone 97 connected to the phone lines 6 by the phone coupling transformer network 5. A small hammer 98 is pivotally mounted. A timer motor driven cam 99 having a plurality of lobes is coupled to the lever or hammer 98 and cyclically actuates the hammer 98 to strike the microphone and tap out a code signal during each revolution. The cam 99 may be geared to the dial motor to provide for transmission of the signal after the tranmission of the telephone number and may include the information as to the locating, type of emergency and the like. The fact that the signal hammer 98 is actuated while operating the dialing mechanism is permissible as the transformer is de-activated at that time via the switch 19.

The illustrated embodiment of thhe invention provides for calling a second remote station 9. Thus the timer drum 56 continues to rotate during which period the coded signal is transmitted.

After a selected period, the phone coupling switches 79 and 84 again engage drum contacts 81 and 88 provided in circumferential spacement to the previously described drum contacts 80 and 88 through control switches 100, 101 and 102 corresponding to the three switches 87, 90 and 95 which are actuated by aligned drum contacts 103, 104 and 105 to produce a corresponding sequencing.

At the end of a second time period, the drum will again have rotated to call the second number. The device will thus continuously recycle to call the numbers in sequence until the fault has been corrected or the alarm unit turned off.

The operation of the illustrated embodiment of the invention is briefly summarized as follows.

The unit is connected through the simple direct wiring of FIG. 6 to the telephone coupling network 5 of the conventional telephone or the like. If an alarm condition arises th sensor 3 will actuate the timer motor 92 to supply the power to the dial motor 25 and to the set coil 49. The circuit board 27 is energized with the power being initially established through the circuit of the control circuit board 57. This will result in the driving of the dial unit and the attached carriage 26 until the brush unit 32 in column one engages the push button contact 39, at which time coil 74 is energized to break the latching circuit, the stepping switch and stop the dial motor. The dial unit 18 will be returned, along with the carriage 26, to the starting position and dial the first number in the telephone number. The circuit will then recycle through a corresponding cycle for dialing the second number and continues to do so until the last digit is transmitted. When that position has been reached, the next column in the circuit board 57 maintains a completely open circuit and, consequently, it is impossible to energize the stepping coil and the dial motor.

The timer 56 continues to operate, however, to turn on the phone coupling transformer network 5 and through actuation of hammer 98 on the microphone 97 will transmit a message.

With the sequencing stepping switch control, the device provides for sequential energization of tthe several dial boards to call stations 8 and 9. The device first transmits the number of the dial board followed by the alarm code information and subsequently turns off that dialing board and turns on the corresponding second dialing board to call the second number and send the same or a different coded message to that number. After the coded message is transmitted to the last dial board number the timer automatically reset all of the dial boards to a standby condition. If the danger or adverse condition had not automatically reset or the unit been manually turned off, the dialing mechanism would recycle to complete the same transmission of the warning to the several telephone locations.

Although shown for the transmission of the signal to a pair of stations, the system can be extended to any number or plurality of different control centers and is shown as including a pair of centers 8 and 9 for purposes of illustration only.

The various other components can also be varied and constructed as desired. For example, the push button unit could be replaced with any other suitable movable element adapted to provide for selective actuation of the two switching matrix providing the control in the actual dialing. Further, rather than having a separate signal motor actuated by the timer, a clutch mechanism might interconnect a single motor to the dialing pulley unit 24. In this case, the single motor would operate continuously to sequentially actuate the timer and the signal coding cam. A clutch unit operated by the stepping switch assembly would selectively engage the motor to the dialing apparatus.

Figure 7:
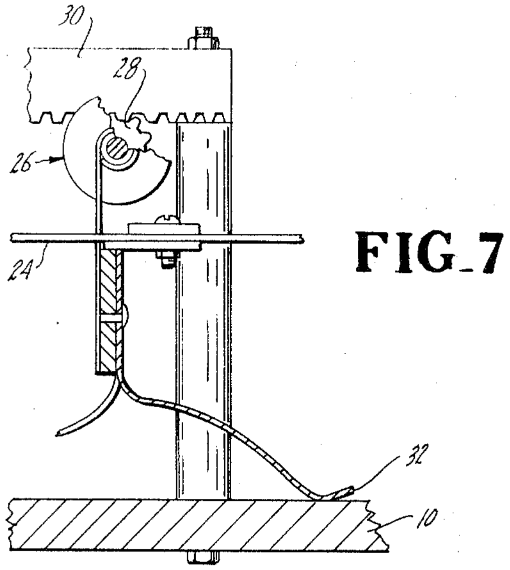
FIG. 7 is a view taken on line 7—7 of FIG. 2.

The present invention might also be applied to a frequency modulating device by having each of the switch devices generate a particular related frequency or actuate a particular frequency oscillator to transmit a corresponding frequency signal. For example, as shown in FIG. 7, an additional dialing board 27 may be constructed with a common contact strip 110 and a series of individual contacts 111, one for each digit. Each contact 111 is connected in series with an oscillator coil 112 to common circuit line terminal 113. The common contact strip 110 and the terminal 113 are connected to the telephone network 5 in series with switch 114 to establish a corresponding frequency signal upon stopping of the movement of the carriage 26.

The present invention thus provides a simple reliable electromechanical device which can be conveniently and reliably applied to the conventional telephone system.

Various modes of carrying out the invention are contemplated as being within the scope of the following claims, particularly pointing out and distinctly claiming the subject matter which is regarded as the invention:

I claim:

1. An automatic call transmitting apparatus for transmission over a telephone line system employing a plurality of unique signals established in sequence for dialing between a transmitting station and a select one of a plurality of receiving stations, each receiving station having a unique multiple call code including a plurality of code character positions with each element selectively including said unique signals, comprising a circuit altering matrix including a plurality of groups of individual circuit altering means, one for each call code character position for coded actuation in accordance with the several elements in said telephone call system to permit insertion of the selected one, scanning means for sequentially scanning each of said plurality of switch means for each of said call code elements in proper sequence, and dialing signal means actuated in accordance with said scanning means to establish the signals on the telephone line connection means in accordance with the code characters, a second circuit altering matrix including a plurality of groups of individual circuit altering means, one for each call code character position in said telephone call system, stepping means forming a part of said scanning means and connecting said scanning means into circuit through said second matrix for sequentially scanning each of saiid first and second matrix, said first and second matrix being secured to a pair of stacked boards, each matrix includes a switch column with said first matrix having a plurality of individual switch means one for each call code character, said columns being located in adjacent parallel arrangement, said second matrix including a common switch means for each column, each of said columns including switch control openings aligned with each individual switch means, selection means adapted to be passed through said openings to enable an aligned individual switch means and the common switch means, said scanning means including a switch actuator mounted to move over said columns and having contact means responsive to engagement with a selection means to activate the corresponding switch means.

2. The automatic call transmitting apparatus of claim 1 wherein said scanning means includes a stepping switch means for successively connecting the corresponding columns of said first and second matrix into circuit, and drive means for said stepping switch means including a start means and a step means connected in circuit through said second matrix.

3. The automatic call transmitting apparatus of claim 1 having a motor, a linear drive means coupled to said motor and said actuator, said dialing signal means including a driven switch means actuated to transmit a call signal to a remote station, a constant rate return means coupled to said actuator and driven switch means to return them to an initial position, and stop means responsive to activation of an individual switch means by the scanning means to release the dialing means and thereby dial the corresponding code.

4. The automatic data transmitting apparatus of claim 1, including a plurality of said first switch matrix boards and each correspondingly constructed to permit individual and separate insertion of a selected one of the possible call code, and timing means for sequentially activating said plurality of switch matrix to sequentially call the related stations.

5. The automatic call transmitting apparatus of claim 1 including a telephone line connection means, a self-cycling timing means having first contact means for connecting of the dialing signal means to a telephone line connection means, a second contact means for simulating the answering of a telephone for said telephone line connection means, and third contact means for energizing said scanning means and said matrix boards.

6. The automatic call transmitting apparatus of claim 5 including a pair of said first matrix boards and said timing means including fourth contact means for energizing said scanning means and the second of said first matrix boards.

7. The automatic call transmitting apparatus of claim 6 wherein said timing means includes a rotating drum having said contact means axially arrayed thereon, the third and fourth sets of contact means being circumferentially offset to sequentially activate the pair of first matrix boards.

8. The automatic data transmitting apparatus of claim 5 wherein a stepping switch means is connected to activate the matrix boards, and said third and fourth contact means each include a pair of switches for sequentially activating the stepping switch means and resetting the stepping switch means.

* * * * *